United States Patent
Rydberg et al.

(10) Patent No.: US 6,360,257 B1
(45) Date of Patent: *Mar. 19, 2002

(54) MANAGING GROUP IP ADDRESSES IN MOBILE END STATIONS

(75) Inventors: Gunilla Rydberg, Partille; Elisabet Mårdberg, Göteborg, both of (SE)

(73) Assignee: Telefonaktiebolaget L M Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,370

(22) Filed: Jan. 30, 1998

(51) Int. Cl.[7] .......................... G06F 15/16; G06F 17/00
(52) U.S. Cl. ........................ 709/223; 709/224; 370/392
(58) Field of Search ................. 709/224, 203, 709/217, 223, 225, 226; 370/392, 402, 406

(56) References Cited

U.S. PATENT DOCUMENTS

| | | | |
|---|---|---|---|
| 5,109,403 A | | 4/1992 | Sutphin ..................... 379/59 |
| 5,159,592 A | * | 10/1992 | Perkins .................... 370/85.7 |
| 5,297,191 A | | 3/1994 | Gerszberg .................. 379/59 |
| 5,297,192 A | | 3/1994 | Gerszberg .................. 379/59 |
| 5,710,885 A | * | 1/1998 | Bondi ....................... 709/224 |
| 5,732,074 A | * | 3/1998 | Spaur ....................... 370/313 |
| 5,742,762 A | * | 4/1998 | Scholl et al. ............... 709/224 |
| 5,754,774 A | * | 5/1998 | Bittinger ................... 709/203 |
| 5,790,541 A | * | 8/1998 | Patrick ..................... 370/392 |
| 5,812,819 A | * | 9/1998 | Rodwin .................. 395/500.44 |
| 5,870,558 A | * | 2/1999 | Branton .................... 709/224 |

FOREIGN PATENT DOCUMENTS

| | | | |
|---|---|---|---|
| EP | 0675660 | 10/1995 | ............ H04Q/7/28 |
| EP | 0794642 | 9/1997 | ........... H04L/29/06 |

OTHER PUBLICATIONS

Electronics and Communications in Japan, Part 1—Communications, vol. 79, No. 10, Oct. 1996, "A Performance Evaluation Method That Uses Simple Network Management Protocol for Radio Local Area Networks", K. Ujiie, pp. 10–16, XP000642672.

Milcom 1996 Conference Proceedings, McLean, VA, vol. 3, No. 15th, Oct. 1996, "Ip Multicasting for Wireless Mobile Hosts", Oct. 1996, G. Xylomenos et al, pp. 933–937, XP000697406.

Wireless Networks, vol. 1, No. 3, Oct. 1995, "Multicast Security and its Extension to a Mobile Environment", L. Gong et al., pp. 281–295, XP000538241.

Mobitex System Presentation NTE 3.1, publication date unknown.

Dictionary of PC Hardware and Data Communications, SNMP—Simple Network Management Protocol, Sep. 1997.

Network Working Group RFC 1112, *Host Extensions for IP Multicasting*, S. Deering, USA, Aug. 1989; pp. 1–16.

CDPD System Specification, Release 1.1, *Overview of Concepts Models and Services*; Jan. 1995, pp. 101–1 to 101–42.

* cited by examiner

*Primary Examiner*—Ayaz Sheikh
*Assistant Examiner*—Khanh Quang Dinh
(74) *Attorney, Agent, or Firm*—Jenkens & Gilchrist, P.C.

(57) ABSTRACT

Management of group IP addresses, through which various services are provided to groups of mobile end stations in a wireless network, includes accessing the group IP addresses without manually accessing the mobile end stations. This permits efficient management of the membership of the groups that receive the various services.

30 Claims, 2 Drawing Sheets

MANAGING GROUP IP ADDRESSES IN MOBILE END STATIONS

FIELD OF THE INVENTION

The present invention relates to services provided to mobile end stations in a wireless network and, more particularly, management of the interface between the service provider and the mobile end stations.

BACKGROUND OF THE INVENTION

FIG. 1 illustrates a conventional system wherein one or more hosts provide services to various mobile end stations 11 via the Internet, a wireless network and the air interface at 13.

FIG. 2 illustrates a conventional system similar to that of FIG. 1, except the hosts that provide the services to the mobile end stations 11 are peer applications located within the wireless network. The hosts provide services to the mobile end stations 11 via the wireless network and the air interface 13.

Many of the services provided by the hosts of FIGS. 1 and 2 are based on the use of Internet Protocol (IP) addresses. Examples of services provided by the hosts include stock market reports, weather reports, and motor vehicle tracking/guidance. Examples of the mobile end stations 11 include interactive (2-way) pagers, mobile telephones, weather report computers, vehicle tracking computers, mobile terminals, and laptop computers with radio modems.

The wireless network of FIGS. 1 and 2 may use the conventional IP protocol as its network protocol, or it may use another conventional communication protocol as its network protocol. For example, the wireless network could be a conventional Mobitex wireless network, which does not use the IP protocol as its network protocol, or the wireless network could be a conventional CDPD (Cellular Digital Pocket Data) wireless network, which uses the IP protocol as its network protocol.

In FIG. 1, if one of the Internet hosts is running an IP application, then it sends IP traffic to specific IP addresses. The mobile end stations 11 typically include a database of addresses including IP addresses that authorize them to receive various services corresponding to their IP addresses. So all mobile end stations 11 having an IP address that matches the IP address specified by the IP traffic from the host will receive the service from the host as a group, in point-to-multipoint fashion.

If the wireless network does not use the IP protocol as its network protocol, then the primary address of each mobile end station is the network address assigned by the network protocol of the wireless network. IP addresses within the various mobile end stations of such a wireless network are herein referred to as secondary IP addresses of the mobile end stations.

If the wireless network does use the IP protocol as its network protocol, then each mobile end station will generally have a fixed primary IP address as assigned by the wireless network, and will also include further IP addresses which specify the services provided to the end station. These further IP addresses are also referred to herein as secondary IP addresses.

If a host in the FIG. 2 system is running an IP application but the wireless network does not use the IP protocol as its network protocol (e.g., the Mobitex network), then the network protocol of the wireless network must be used to convey the IP traffic from the host within the wireless network. This is conventionally accomplished using a gateway GW.

One problem with conventional systems such as shown in FIGS. 1 and 2 is the management of which of the aforementioned secondary IP addresses a particular mobile end station is authorized to use, that is, which services are to be received by which mobile end station. Because of the expense associated with the relatively scarce radio channel resources used in wireless networks, it is particularly important, for example, to be able to quickly add a mobile end station as a subscriber to a given service. Efficient control of which services are supplied to which mobile end stations also provides a bookkeeping tool for service providers.

Some conventional examples of how the aforementioned secondary IP addresses are provided in mobile end stations include (1) entering them in the SIM card of the end station, (2) entering them into the IP stack of, for example, a laptop computer, (3) using proprietary IP address management applications, or (4) entering them manually when the corresponding subscriptions are purchased. In order to use any of the aforementioned techniques for IP address management in a mobile end station, the mobile end station must disadvantageously be transported to a service center. The aforementioned techniques are then performed by professional personnel at the service center who have manual access to the mobile end station.

It is therefore desirable to provide for management of secondary IP addresses in a mobile end station without requiring the mobile end station to be transported to a service center or manually accessed.

The present invention provides for management of IP addresses in mobile end stations without the need to manually access the mobile end station or transport the mobile end station to a service center for management of its IP addresses. With the present invention, services provided via IP addresses can be subscribed to or canceled without manually accessing the mobile end station or transporting the mobile end station to a service center.

DETAILED DESCRIPTION OF THE DRAWINGS

Figure 1:
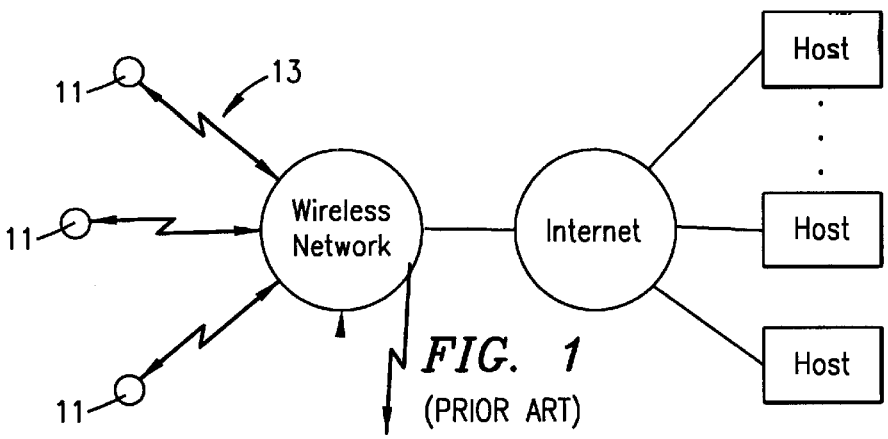
FIG. 1 illustrates a conventional system for delivering services to mobile end stations.
Figure 2:
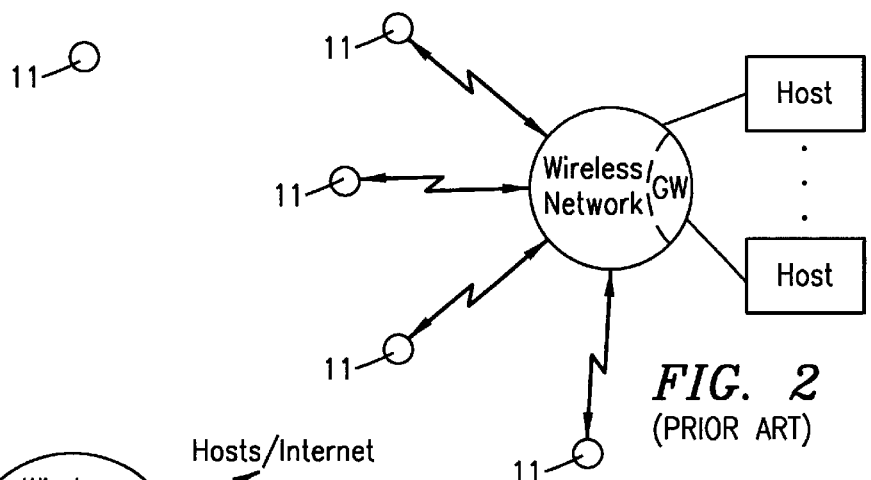
FIG. 2 illustrates another conventional system for delivering services to mobile end stations.
Figure 3:
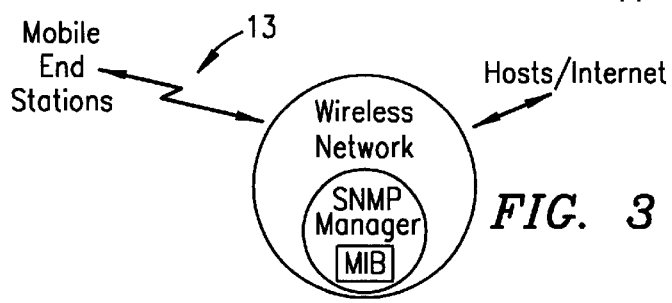
FIG. 3 illustrates a system for providing services to mobile end stations according to the present invention.

Example FIG. 3 illustrates diagrammatically a system according to the present invention wherein a host provides services to mobile end stations via a wireless network as shown in FIG. 2 or via a combination of the Internet and a wireless network as shown in of FIG. 1. The system of FIG. 3 utilizes conventional Simple Network Management Protocol (SNMP) to facilitate management of secondary IP addresses in the mobile end stations. FIG. 3 illustrates an SNMP Manager provided in the wireless network, and FIG. 4 illustrates that each of the mobile end stations of FIG. 3 includes an SNMP Agent.

Figure 4:
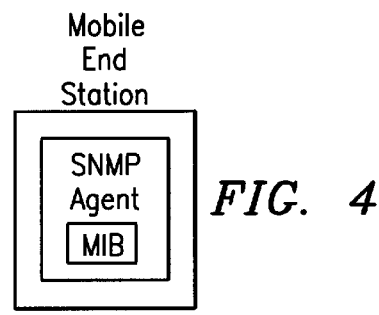
FIG. 4 illustrates in greater detail a portion of the mobile end stations of FIG. 3.

As is the well known in the art, the Simple Network Management Protocol uses the SNMP Agent of FIG. 4, namely software that communicates with the SNMP Manager of FIG. 3. The SNMP Agent stores variables as counters, or stores variables in two-dimensional or simpler tables. In the present invention, the secondary IP addresses of the mobile end station are stored as variables in the SNMP Agent and also in the SNMP Manager.

The conventional SNMP protocol supports a GET function wherein the SNMP Manager retrieves a specified variable's current value from the agent, and also supports a SET function wherein the SNMP Manager sets a variable in the agent to a desired value. If the secondary IP addresses are defined as variables in the SNMP Agent, the SNMP Manager can modify the secondary IP addresses of the end station.

The SNMP variables themselves, that is, the secondary IP addresses within the SNMP Agent, are defined by a Management Information Base (MIB). As shown in FIGS. 3 and 4, the SNMP Manager and the SNMP Agents of the mobile end stations each include an MIB. The SNMP Manager will have an MIB identical to the MIB of each SNMP Agent associated therewith. Thus, if there are six mobile end stations in FIG. 3, then the SNMP Manager will have six MIBs that respectively match the six MIBs in the SNMP Agents of the six mobile end stations.

In addition to secondary IP addresses, the MIBs of each agent will also typically contain service parameters which make it possible for the SNMP Manager to manage various features of the services by modifying these service parameters. As mentioned above, it is also possible to have a different MIB (different information) in every agent.

The agents define the MIB version that will be used by the manager in conjunction with that particular agent. It is advantageous to support several versions (i.e., layouts or configurations) of the MIB because this will allow the MIB to be upgraded and will allow the network to gradually migrate from one version of MIB to another. For example, if an additional feature is added to a given service, and a new parameter in the MIB is needed in order to use this feature, then a new version of MIB is installed to permit the subscribing end stations to access the new feature of the service.

Figure 5:
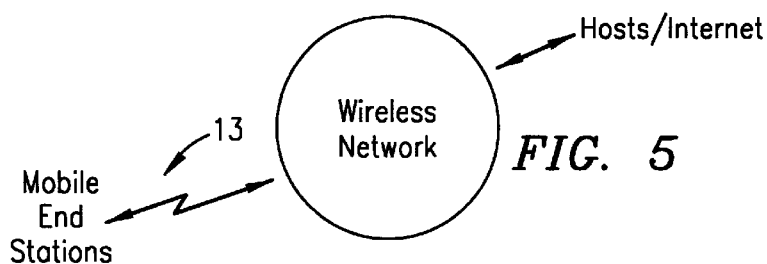
FIG. 5 illustrates another system for delivering services to mobile end stations according to the present invention.
Figure 6:
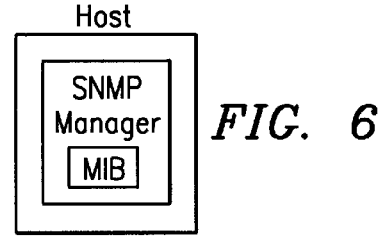
FIG. 6 illustrates in greater detail a portion of a host of FIG. 5.

FIG. 5 illustrates a system similar to that of FIG. 3, except the SNMP Manager is not provided in the wireless network. Rather, as shown in FIG. 6, an SNMP Manager is provided in one (or more) of the hosts. Thus, a system according to the present invention can include a single SNMP Manger in combination with SNMP Agents for each of the mobile end stations, and the SNMP Manager can be located in the wireless network or in one of the hosts.

Figure 7:
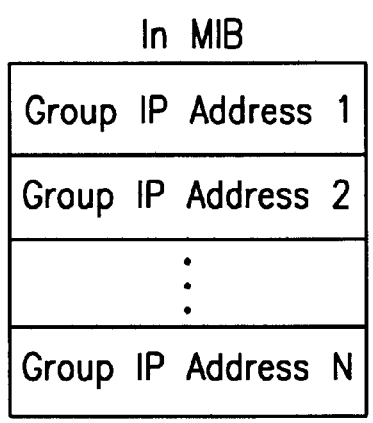
FIG. 7 illustrates a portion of the Management Information Base of FIGS. 3, 4 and 6.

Example FIG. 7 illustrates in greater detail a portion of the MIB of FIGS. 3, 4 and 6. The MIB of FIG. 7 includes a plurality of group IP addresses. The group IP addresses of FIG. 7 correspond to the secondary IP addresses described above, but are referred to here as group IP addresses because such IP addresses will typically be contained in a plurality, or group, of mobile end stations. For example, all mobile end stations that subscribe to a particular service will contain the IP address used to deliver that service.

Thus, group IP address 1 of FIG. 7 could correspond to a stock market update service which is received by a plurality of mobile end stations, each of which includes group IP address 1. Similarly, group IP address 2 could correspond to a weather reporting service, and could be included in a plurality of other mobile end stations which also receive the weather reporting service. Each of the group IP addresses of FIG. 7 corresponds to a service received by the mobile end station in whose MIB those addresses are located.

Figure 8:
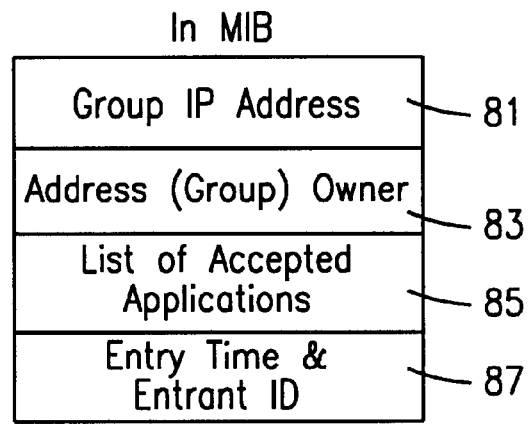
FIG. 8 illustrates in greater detail a portion of the Management Information Base of FIG. 7.

Example FIG. 8 illustrates the information in the MIB associated with a single group IP address such as group IP address 1 of FIG. 7. The group IP address itself, indicated at 81 in FIG. 8, is the address which permits the mobile end station to receive the associated service. The SNMP Manager can use the SNMP SET function to change the group IP address 81 so that the end station receives a different service, or the SNMP Manager can set the group IP address 81 to a null value which prevents the mobile end station from receiving any services via the group IP address at 81.

At 85 in FIG. 8 is a list of applications which are acceptable for use with the group IP address 81. For example, a list of TCP (Transmission Control Protocol) or UDP (User Datagram Protocol) port numbers could be included here. Then, if the end station receives from a TCP or UDP application traffic directed to the group IP address at 81, but the port number of that application does not appear in the list at 85, then the traffic will be ignored On the other hand, if the traffic from the TCP or UDP application does include a port number that is included in the list at 85, then the traffic will be accepted. The SNMP Manager can add entries to or remove entries from the list 85 as desired.

An indication of entry time and entrant ID is shown at 87. The entry time provides a record of the time at which the current group IP address at 81 was set into the MIB by the SNMP Manager, and the entrant ID provides identification of the particular SNMP Manager which entered the current group IP address.

The address or group owner information at 83 identifies the current group owner associated with the group of end stations having the group IP address at 81 in common and therefore receiving a service in common. The concept of a group owner is described in more detail below with respect to FIG. 9.

The MIB structure illustrated in FIGS. 7 and 8 permits the SNMP Manager to manage the group IP addresses in the MIBs of the various mobile end stations. For example, if it is desired to delete two mobile end stations from a particular group that receives motor vehicle traffic reports, and to add three other mobile end stations to that group, then the SNMP Manager would perform the following operations. In the two mobile end stations that are to be deleted from the group, the SNMP Manager would set the group IP address corresponding to the motor vehicle traffic service to a null value. In each of the three mobile end stations that are to be added to the group, the SNMP Manager would set an appropriate one of the group IP addresses, such as at 81, to the group IP address corresponding to the motor vehicle traffic reporting service. Also, the SNMP Manager could, in the MIBs of the added mobile end stations, record the entry time and set the entrant ID.

Figure 9:
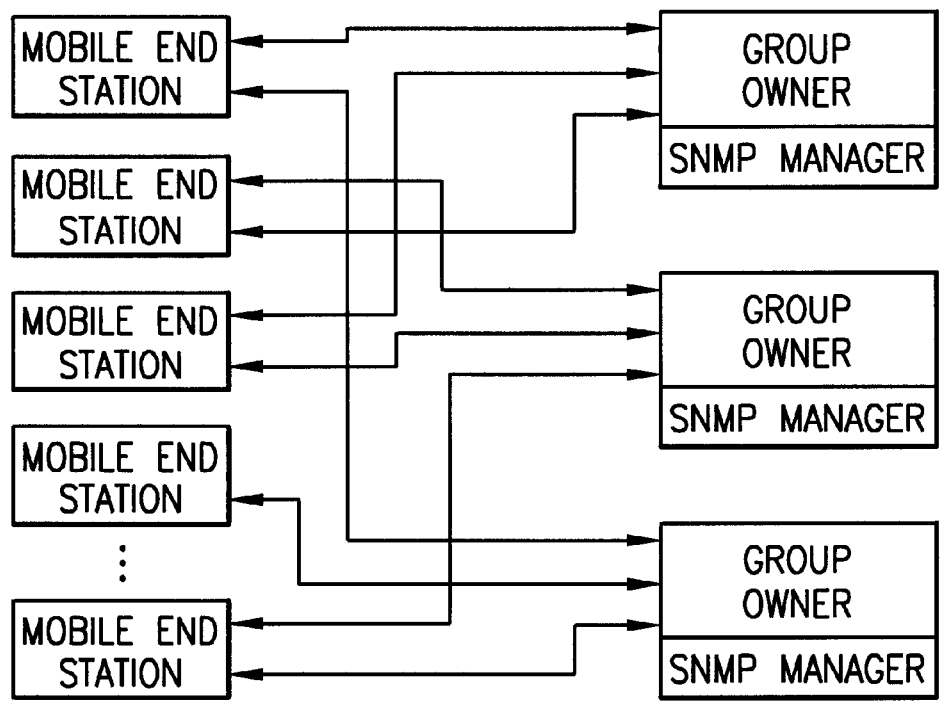
FIG. 9 illustrates an arrangement according to the present invention wherein a group owner that provides a service to a group of end stations also manages that service in that group of end stations.

FIG. 9 illustrates a plurality of group owners that each provide services to a group of mobile end stations. Although the wireless network and Internet are omitted in FIG. 9, it should be clear from the foregoing that the group owners can provide the services to the various groups via the wireless network or via the wireless network and the Internet. Each group owner in FIG. 9 could be, for example, a host that provides a specified service to a group of mobile end stations. Each group owner in FIG. 9 has its own SNMP Manager for managing the IP addresses in the end stations of its group. However, regardless of the number of groups and the number of group owners in the system, a single SNMP Manager located in the wireless network or located in one of the hosts can, if desired, be used to manage IP addresses for all end stations in the network.

Although exemplary embodiments of the present invention have been described above in detail, this does not limit the scope of the invention, which can be practiced in a variety of embodiments.

What is claimed is:

1. A method of managing a group of mobile end stations each of which contains a group Internet Protocol (IP) address that is common to mobile end stations of the group and is associated with a subscription-based service that is provided to the mobile end stations in the group by a server, the method comprising:

routing IP traffic associated with the service through a wireless communication network to the group of mobile end stations in accordance with a point-to-multipoint communications scheme, the IP traffic provided to the group of mobile end stations containing the group IP address;

determining that a further mobile end station is to join the group and be added as a subscriber to the subscription-based service; and adding the group IP address to the further mobile end station by using a Simple Network Management Protocol (SNMP) manager that is located remotely from the further mobile end station to modify a variable stored in an SNMP agent to indicate that the further mobile end station is to receive IP traffic associated with the subscription-based service provided to the group of mobile end stations containing the group IP address, the SNMP agent provided in the further mobile end station.

2. The method of claim 1, wherein said adding step includes modifying the variable from a first value to a second value that differs from the first value and that corresponds to the group IP address.

3. The method of claim 1, further comprising the step of providing within each of the mobile end stations of the group a list of applications from which each such mobile end station is permitted to accept communication.

4. The method of claim 3, wherein said providing step includes using the SNMP manager that is located remotely from the group of mobile end stations to modify variables in respective SNMP agents provided in the respective mobile end stations.

5. The method of claim 1, further comprising the steps of:

determining that one of the mobile end stations is to leave the group and be deleted as a subscriber to the service; and removing the group IP address from that one mobile end station without manually accessing the one mobile end station, to prevent the IP traffic from being routed to that one mobile end station.

6. The method of claim 5, wherein said removing step includes using the SNMP manager that is located remotely from the one mobile end station to modify a variable in an SNMP agent provided in the one mobile end station.

7. The method of claim 1, further comprising the steps of:

storing a service parameter associated with the service in at least one of the mobile end stations of the group, the service parameter for controlling the at least one mobile end station's access to a portion of the IP traffic directed to the group of mobile end stations; and modifying the service parameter stored in the at least one mobile end station to modify the service accessible by the at least one mobile end station.

8. The method of claim 7, wherein said modifying step includes using the SNMP manager that is located remotely from the at least one mobile end station to modify the service parameter stored in an SNMP agent in the at least one mobile end station.

9. The method of claim 1, wherein one of the mobile end stations is one of an interactive pager, a mobile telephone, a mobile terminal, a computer, and a radio modem.

10. The method of claim 1, wherein the service is one of stock market reporting, weather reporting and motor vehicle tracking services.

11. The method of claim 1, wherein the server accesses the wireless network via the Internet.

12. A method of managing a group of mobile end stations each of which contains a group Internet Protocol (IP) address that is common the mobile end stations of the group and is associated with a subscription-based service that is provided to the mobile end stations in the group by a server, the method comprising:

routing IP traffic associated with the service through a wireless communication network to the group of mobile end stations in accordance with a point-to-multipoint communications scheme, the IP traffic provided to the group of mobile end stations containing the group IP address;

determining that one of the mobile end stations is to leave the group and be deleted as a subscriber to the service; and removing the group IP address from the one mobile end station by using a Simple Network Protocol Manager (SNMP) that is located remotely from the one mobile end station to modify a variable stored in an SNMP agent to indicate that the one mobile end station is not to receive IP traffic associated with subscription-based service provided to the group of mobile end stations containing the group IP address, the SNMP agent provided in the one mobile end station.

13. The method of claim 12, wherein said removing step includes modifying the variable from a first value that corresponds to the group IP address to a second value that differs from the first value.

14. The method of claim 12, further comprising the step of providing within each of the mobile end stations a list of applications from which that mobile end station is permitted to accept communication.

15. The method of claim 14, wherein said providing step includes using the SNMP manager that is located remotely from the mobile end stations to modify variables in respective SNMP agents provided in the respective mobile end stations.

16. The method of claim 12, further comprising the steps of:

storing a service parameter associated with the subscription-based service in at least one of the mobile end stations of the group, the service parameter for controlling the at least one mobile end station's access to a portion of the IP traffic directed to the group IP address; and modifying the service parameter stored in the at least one mobile end station to modify the service accessible by the at least one mobile end station.

17. The method of claim 16, wherein said modifying step includes using the SNMP manager that is located remotely from the at least one mobile end station to modify the service parameter stored in an SNMP agent in the at least one mobile end station.

18. The method of claim 12, wherein one of the mobile end stations is one of an interactive pager, a mobile telephone, a mobile terminal, a radio modem, and a computer.

19. The method of claim 12, wherein the service is one of stock market reporting, weather reporting and motor vehicle tracking services.

20. The method of claim 12, wherein the server accesses the wireless network via the Internet.

21. A mobile end station for use with a wireless communication network and having a network address assigned thereto by the wireless communication network for routing communications thereto via the wireless communication network, the mobile end station comprising:

a memory for storing therein a group Internet Protocol (IP) address that is common to a group of mobile end stations and is associated with a subscription-based service that is provided to the group of mobile end stations by a server, the server delivering the subscription-based service by routingy IP traffic associated with the subscription-based service through the wireless communication network to the group of mobile end stations containing the group IP address in accordance with a point-to-multipoint communication scheme, the IP traffic delivered to the group of mobile end stations containing the group IP address;

an input for permitting said group IP address to be stored in and removed from said memory via the wireless communication network in response to a signal from a Simple Network Management Protocol (SNMP) manager; and an SNMP Agent accessible from said input for communicating with the SNMP manager, said memory associated with said SNMP Agent.

22. A wireless communication system, comprising:

a wireless communication network;

a plurality of mobile end stations coupled to said wireless communication network and having respective network addresses assigned thereto by said wireless communication network for routing communications thereto via the wireless communication network;

a host server coupled to said wireless communication network for providing a subscription-based service to a group of mobile end stations via said wireless communication network, each mobile end station of said group having stored therein a group Internet Protocol (IP) address that is common to all mobile end stations of said group and is associated with the subscription-based service;

each mobile end station of said group including a memory for storing said group IP address therein, said host server operable for providing said service to any of said mobile end stations having said group IP address stored therein by routing IP traffic associated with the subscription-based service through said wireless communication network to said mobile end stations in accordance with a point-to-multipoint communication scheme, the IP traffic delivered to the group of mobile end stations containing the group IP address; and a Simple Network Management Protocol (SNMP) manager coupled by said wireless communication network to said mobile end stations and operable to store said group IP address in said mobile end stations and remove said group IP address from said mobile end stations without manually accessing said mobile end stations.

23. The system of claim 22, wherein said mobile end stations each include an SNMP agent which cooperates with said SNMP manager, said memory of each said mobile end station associated with said SNMP agent of said mobile end station.

24. The system of claim 22, wherein said host server includes said SNMP manager.

25. The system of claim 24, wherein said host server is coupled to said wireless communication network by the Internet.

26. The system of claim 22, wherein said SNMP manager is in said wireless communication network.

27. The mobile end station according to claim 21, wherein said memory stores a second group IP address common to a second group of mobile end stations and is associated with a second subscription-based service that is provided to the second group of mobile end stations.

28. The mobile end station according to claim 21, wherein said memory stores a plurality of group IP addresses, each of the plurality of group IP addresses associated with a distinct service and common to a distinct group of mobile end stations.

29. The mobile end station according to claim 22, wherein said memory stores a second group IP address common to a second group of mobile end stations and is associated with a second subscription-based service that is provided to the second group of mobile end stations.

30. The mobile end station according to claim 22, wherein said memory stores a plurality of group IP addresses, each of the plurality of group IP addresses associated with a distinct service and common to a distinct group of mobile end stations.

* * * * *

UNITED STATES PATENT AND TRADEMARK OFFICE
CERTIFICATE OF CORRECTION

PATENT NO.    : 6,360,257 B1  
DATED         : March 19, 2002  
INVENTOR(S)   : Rydberg et al.

It is certified that error appears in the above-identified patent and that said Letters Patent is hereby corrected as shown below:

<u>Column 7,</u>
Line 25, replace "routingy" with -- routing --

Signed and Sealed this

Sixteenth Day of July, 2002

*Attest:*

*Attesting Officer*

JAMES E. ROGAN
*Director of the United States Patent and Trademark Office*